US008285085B2

(12) United States Patent
Manico et al.

(10) Patent No.: US 8,285,085 B2
(45) Date of Patent: Oct. 9, 2012

(54) SOFTWARE AND SYSTEM FOR CUSTOMIZING A PRESENTATION OF DIGITAL IMAGES

(75) Inventors: Joseph A. Manico, Rochester, NY (US); John K. McBride, Rochester, NY (US); Dale F. McIntyre, Honeoye Falls, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1331 days.

(21) Appl. No.: 11/503,597

(22) Filed: Aug. 14, 2006

(65) Prior Publication Data
US 2006/0277120 A1    Dec. 7, 2006

Related U.S. Application Data

(62) Division of application No. 10/178,976, filed on Jun. 25, 2002, now Pat. No. 7,236,960.

(51) Int. Cl.
*G06K 9/00*  (2006.01)
*G06F 3/00*  (2006.01)
(52) U.S. Cl. .................. 382/325; 382/100; 715/730
(58) Field of Classification Search .......... 382/100, 382/325; 715/730
See application file for complete search history.

(56) References Cited

U.S. PATENT DOCUMENTS

| 5,241,659 A | 8/1993 | Parulski et al. |
| 6,147,742 A | 11/2000 | Bell et al. |
| 6,351,556 B1 | 2/2002 | Loui et al. |
| 7,082,227 B1 * | 7/2006 | Baum et al. ............... 382/311 |
| 2002/0029242 A1 | 3/2002 | Seto |
| 2003/0043191 A1 * | 3/2003 | Tinsley et al. ............. 345/762 |
| 2003/0126136 A1 * | 7/2003 | Omoigui ..................... 707/10 |
| 2003/0128877 A1 * | 7/2003 | Nicponski ................ 382/224 |
| 2004/0091232 A1 * | 5/2004 | Appling, III ............... 386/46 |

FOREIGN PATENT DOCUMENTS

| EP | 1 133 142 | 9/2001 |
| EP | 1 139 256 | 10/2001 |
| EP | 1 146 725 | 10/2001 |
| EP | 1 154 432 | 11/2001 |
| JP | 2001 339595 | 12/2001 |
| WO | 01/13277 A2 | 2/2001 |
| WO | 01/99403 | 12/2001 |
| WO | WO 0199403 A2 * | 12/2001 |

* cited by examiner

*Primary Examiner* — Bhavesh Mehta
*Assistant Examiner* — Nirav G Patel
(74) *Attorney, Agent, or Firm* — Raymond L. Owens (57) ABSTRACT

A method for customizing a presentation of a set of digital images provided by a user is disclosed, comprising the steps of selecting an initial presentation format criteria for the set of digital images by the user; analyzing the digital images for additional information; providing to the user a first portable electronic storage medium having the set of digital images stored thereon, the images capable of being presented to the user on a display device in accordance with a first presentation format based upon the initial selected presentation format criteria and the analysis of the additional information; and providing a software program to the user enabling the user to select additional presentation format criteria.

6 Claims, 7 Drawing Sheets

FIG. 1

FIG. 2 picturelab, inc 1234-5678 — 125

NAME ______________________

ADDRESS ___________________  } — 130

PHONE NO. _________________

CUSTOMER I.D. NO. __________

- ☐ 35 mm prints
- ☐ 35 mm slides
- ☐ Advanced Photosystem
- ☐ Picture CD
- ☐ *Multimedia Disk* — 135

---

If *Multimedia Disk* is selected, indicate materials submitted:

140 —
- ☐ 35 mm film
- ☐ prints
- ☐ CD
- ☐ APS film
- ☐ flash mem card
- ☐ audio tape
- ☐ one time use camera
- ☐ diskette
- ☐ video tape

*Multimedia Disk* formats (pick one from each category):

145 — THEME/STYLE
- ☐ Christmas
- ☐ MTV Video
- ☐ Halloween
- ☐ Documentary
- ☐ Birthday
- ☐ Dance Party 150 — MUSIC TYPE
175 —
- ☐ Rock
- ☐ Jazz
- ☐ Country
- ☐ Classical
- ☐ Oldies
- ☐ Blues 155 — TRANSITIONS
- ☐ Fade
- ☐ Page
- ☐ Dissolve
- ☐ Starburst
- ☐ Wipe
- ☐ Mix

SOFTWARE AND SYSTEM FOR CUSTOMIZING A PRESENTATION OF DIGITAL IMAGES

CROSS REFERENCE TO RELATED APPLICATIONS

This is a divisional application of Ser. No. 10/178,976 filed Jun. 25, 2002 now U.S. Pat. No. 7,236,960 by Joseph A. Manico et al.

FIELD OF THE INVENTION

This invention is in the field of multimedia authoring systems and software and, more particularly, it is in the field of template-based multimedia authoring systems and software where an initial multimedia presentation may be easily edited or otherwise modified by a user to create an improved presentation.

BACKGROUND OF THE INVENTION

It is widely recognized that viewing images in the form of a multimedia presentation is much more compelling than simply skimming through a stack of hard-copy prints, or looking at a series of static images presented sequentially using a slide projector, computer, or television screen. The addition of other elements to the presentation such as a sound track appropriate to the content of the images, the insertion of interesting transitions between the images, the addition of a video clip or the creation of various video-style special effects including fades and dissolves, image-collaging, or colorization makes the presentation much more interesting to the viewer and can greatly enhance the emotional content of the images being presented. The proliferation in the home of new television-based viewing platforms able to accommodate multimedia, including DVD or Video CD players, also increases the demand for this type of presentation.

For the ordinary photographic consumer, the creation of a multimedia presentation is not presently very convenient. Even if the images are available in digital form, a consumer must have facility with multimedia authoring software tools such as Macromedia Director™ or Adobe Premier™ in order to create such a presentation. These software tools, while very flexible, are aimed more at the professional presentation creator, have multiple options, and require a great deal of time and experience to develop the skill needed to use them to advantage. More recently, template-based multimedia presentation applications such as Photojam™, offered by Shockwave.com, or PC-based "movie making" applications such as Apple's I-Movie™ have become available. While these applications can simplify the creation of multi-media presentations for a consumer, they offer only a limited choice of initial presentation options, or do not offer much in the way of enabling the user to easily edit and improve the initial presentation. In addition, these applications offer no way for a user to easily and conveniently access various kinds of additional material such as stock images, graphics, video, sound clips, either public domain or copyrighted material, which could be used to make presentations much more exciting and compelling.

Thus, there remains a need for a simplified authoring system where an inexperienced user can easily create, edit, update, and customize a multimedia presentation and then obtain copies of the presentation in a variety of storage formats useful with multiple types of presentation devices.

SUMMARY OF THE INVENTION

In answer to these and other needs, and in accordance with one aspect of the present invention, there is provided a method for customizing a presentation of a set of digital images provided by a user, comprising the steps of analyzing the digital images for semantic information, and providing the digital images in association with a first presentation format that can be viewed by the user, the format automatically selected in accordance with the semantic information.

In accordance with another aspect of the present invention, there is also provided a portable electronic storage medium having at least one digital image stored thereon, the at least one digital image capable of being presented to a user on a display device wherein the at least one digital image displayed in accordance with a first presentation format, and a software program having the ability to present the at least one digital image in accordance with a second presentation format different from the first presentation format.

In accordance with still another aspect of the present invention, there is also provided a portable electronic storage medium having at least one digital image stored thereon, the at least one digital image being capable of being presented to a user on a display device in association with at least one sample presentation format, and a software program for presenting the at least one digital image with respect to a plurality of partial presentation formats and means for selecting one of the plurality of partial presentation formats so that an entire presentation format associated with the partial presentation format can be applied to the digital image.

In accordance with still another aspect of the present invention, there is also provided a portable electronic storage medium having at least one digital low resolution image stored thereon, the at least one digital low resolution image being capable of being presented to a user on a display device in association with a plurality of different sample presentation formats, and a software program for presenting the at least one digital low resolution image with respect to the plurality of sample presentation formats and means for selecting one of the plurality of sample presentation formats so that an entire presentation format associated with the sample presentation format can be applied to an associated high resolution digital image, stored separately by a service provider, with the low resolution digital image.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Figure 1:
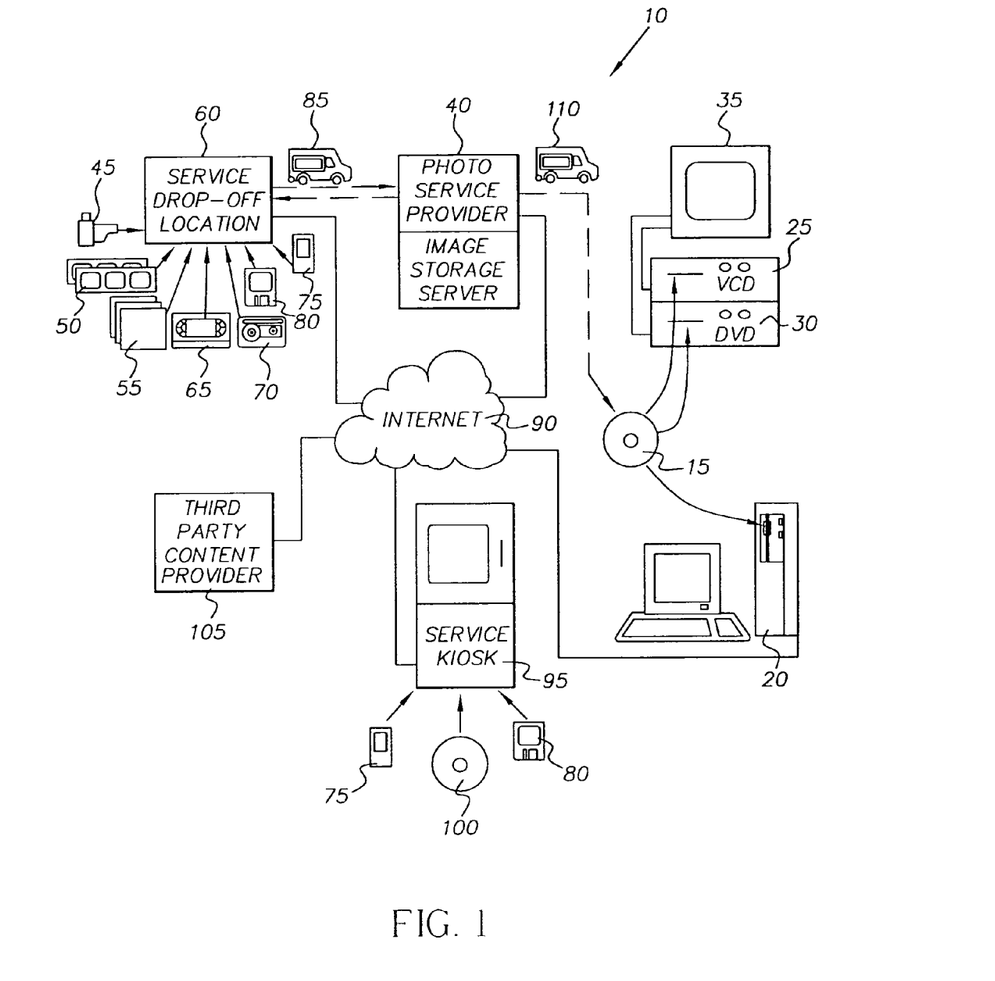
FIG. 1 depicts a block diagram for a system made in accordance with the present invention.

Turning first to FIG. 1, there is shown an overall diagram for a system 10 according to the present invention for providing a multimedia presentation to a user on an image storage and playback media disk 15. Disk 15 is playable on a user's computer 20, video CD (VCD) player 25, or DVD player 30, set-top box or game box (not shown) where these latter players are connected to the user's television set 35. To initiate a request for a multimedia presentation, the user first provides images and other content to a photo service provider 40. As shown in FIG. 1, in one embodiment of the invention images are provided to the photo service provider 40 in the form of unprocessed exposed film 45, negatives 50, or prints 55 at a service drop-off location 60. Multimedia material such as videotape 65 or audio cassette 70 may also be provided. In addition, images and multimedia material may be provided in digital form on various kinds of removable memory such as a flash memory card 75 or computer disk 80. The images or multimedia materials are sent by conventional transportation means 85 to the photo service provider 40 for processing and preparation. As an alternative, where images and multimedia material are provided in digital form on a removable flash memory card 75 or disk 80, the data from these media may be read out at the service drop-off location 60 and transferred electronically to photo service provider 40 by means of a communications network such as the Internet 90. In this way the removable memory devices may be returned to the customer immediately. In another embodiment, described in more detail later, images and multimedia content may be provided by a user from a service kiosk 95, again using removable memory devices such as a flash memory card 75, or computer disks 80 or 100. Data collected by readers (not shown in FIG. 1) at the service kiosk 95 is transferred electronically to the photo service provider 40 via the Internet 90. In yet another embodiment (described in more detail later), images and multimedia material may be uploaded directly from a user's computer 20 to photo service provider 40 using the Internet 90. In certain other embodiments to be described later, part of the content of the multimedia presentation may be derived from a third party content provider 105 in communication with the photo service provider 40 via the Internet 90. Once a multimedia presentation disk 15 has been prepared and ordered by a user, it is delivered to the user via conventional delivery means 110 including, for example, the US mail service or one of a number of the well-known private delivery carriers.

Figure 2:
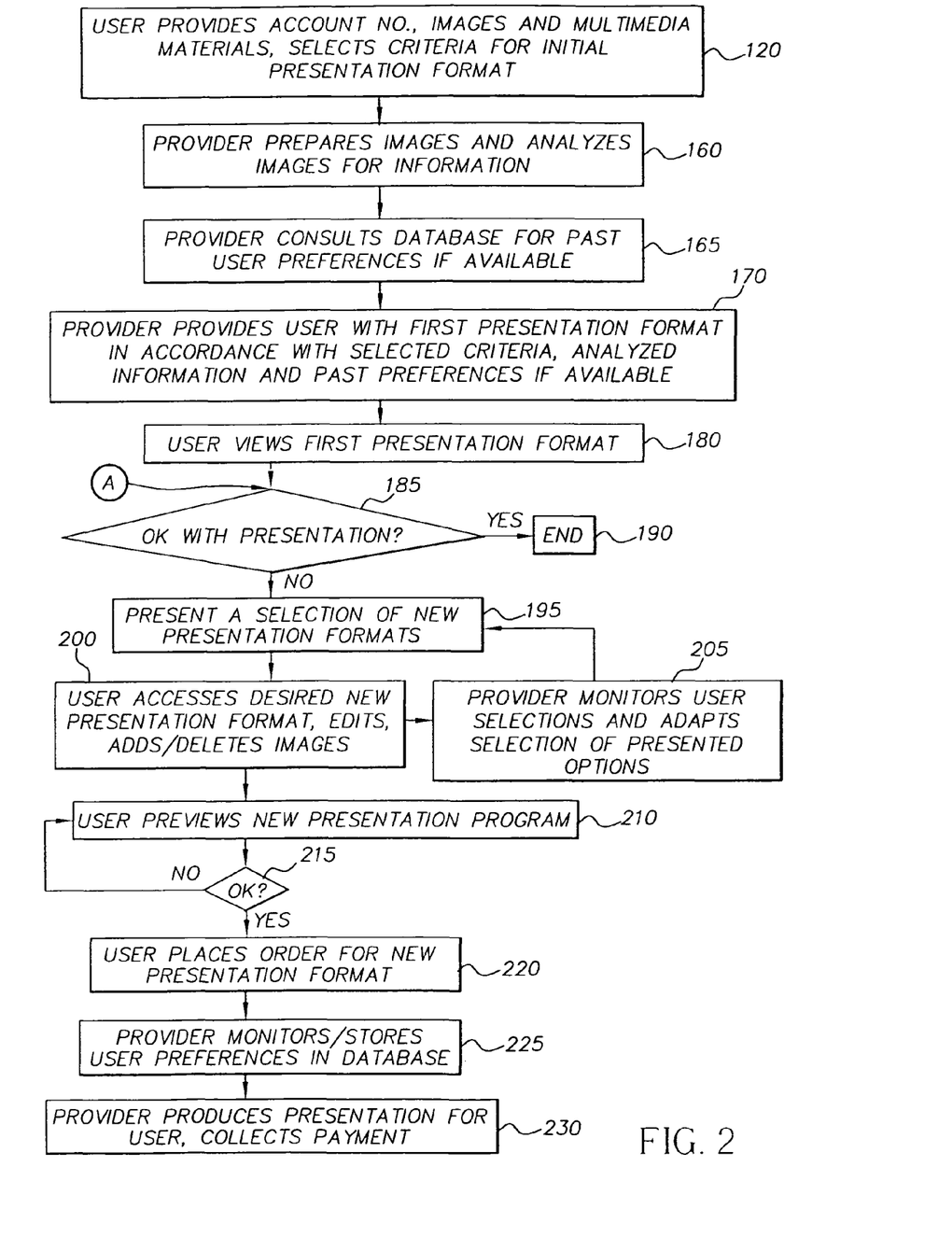
FIG. 2 depicts a flow chart illustrating the steps required in the practice of an embodiment of the present invention.
Figure 3:
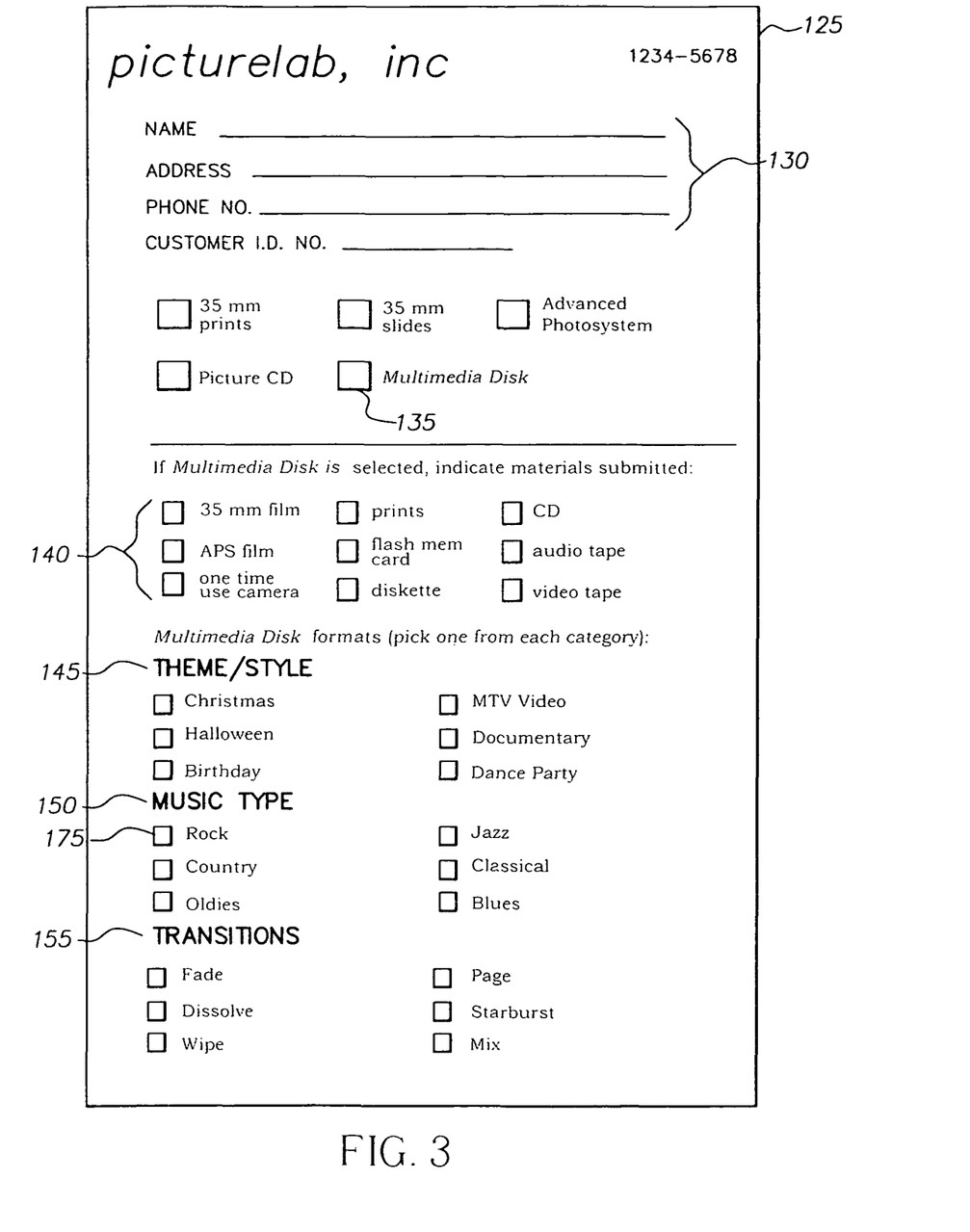
FIG. 3 depicts a photographic services request bag useful in the practice of the present invention.

In order to more completely explain the present invention, the operation of several preferred embodiments will now be described in detail. Referring first to FIG. 2, there is shown a flowchart illustrating the operation of a preferred embodiment of the invention. Initially, in step 120, a user provides an account or user I.D. number, if one exists, to photo service provider 40, submits images or other multimedia materials and selects a format for a first multimedia presentation. If there is no pre-existing account, the user will be prompted to initiate one. Images may be submitted to the photo service provider 40 in any number of ways. For example, the user may submit a roll of exposed film or a one-time use camera containing exposed film, or strips of negatives which have been suitably marked to indicate the images to be included in the multimedia presentation. Positive transparencies, or photographic prints may also be supplied to the service provider 40. Digital images stored on a flash memory card, magnetic or optical computer storage disk, or other type of removable digital memory device may also be submitted. Video or audio tapes along with information indicating the selection of video scene or audio segment may also be included. In FIG. 3, a photo service request bag 125 useful for the practice of this embodiment of the invention is shown. After first filling out the customer name and address and user ID number information on lines 130, the user selects the "multimedia disk" option box 135. The user specifies the types of multimedia materials (as described above) submitted by checking the boxes in section 140 of the form. The user also selects the options to be included in the first presentation, including "THEME/STYLE" 145, "MUSIC TYPE" 150 and type of "TRANSITIONS" 155 desired. It should be understood that the invention is not limited to the format options illustrated here, and that within the scope of the invention, there may be also other types format selection choices offered to the user such as, for example, options relating to the overall mood of the presentation (e.g., "happy", "somber", etc) or relating to a particular event (Daytona 500 race) or venue-related theme (Disney World). Multimedia materials are placed in the bag and the bag is then submitted at a photo service pick-up location.

As an alternative to submitting images and multimedia materials at a service drop off point, a user may also submit images to photo service provider 40 in step 120 by electronic transfer. Digital images along with presentation format selections may be uploaded directly to photo service provider 40 from the user's personal computer using the Internet, or from a service kiosk connected to the service provider by a communications network where images are brought to the kiosk by a user on any kind of removable memory storage device such as a flash memory card, or magnetic or optical computer storage disk. In addition, digital images already pre-stored in a pre-existing account with photo service provider 40 can be specified for requesting a multimedia presentation. For example images stored in an on-line photoalbum such as those offered by the Internet-based photo site, Ofoto™ may be specified. Pre-stored digital images along with presentation formats may be specified by a user by any means of communicating with the service provider over a communications network including a user's personal computer, or from a kiosk, or by telephone, or by submitting a paper request form (not shown) to the photo service provider 40.

Returning again to FIG. 2, once a user has submitted images and/or other multimedia materials and a selection of presentation formats to the photo service provider 40, in step 160 the photo service provider 40 next prepares the images, should this be required (e.g., the service provider 40 processes any exposed film submitted and/or digitizes the images from hard copy images or from the video or audio tape submitted.) If digital images have been supplied by the user, these images may include additional information in the form of image metadata which can contain, among other things, information regarding the date, time and location where the image was recorded, or information about the subject matter of the image. Any such metadata present with the images is also analyzed by the service provider in step 160. Additional information regarding the images supplied may also include the orientation of the image ("landscape" or "portrait" orientation), which may be determined by an automatic analysis of digital image files by methods well known in the art. The presence and elimination of any blank frames which may be present in film which has been submitted may also be determined, again by well known methods, and these frames automatically eliminated from any subsequent presentation format, also in step 160. If a user already has an established account with the service provider 40 and has supplied a user ID or account number in step 120, the service provider 40 in step 165 consults a database of stored past user preferences to determine if the user has requested multimedia disks in the past, and, if so, which presentation formats had been requested. Next, in step 170, the service provider prepares a first multimedia presentation disk, based upon the user-selected format, metadata information and past preferences of the user. As an example of how this metadata information may be used, the metadata may contain information about the dates or times or subjects of the images supplied, and this information may be used to group the images in the first presentation in a certain way, or present them in a particular order. This grouping can be achieved using an event clustering algorithm such as the one described in U.S. Pat. No. 6,351,556, to Loui and Pavie, which discloses a method for automatically comparing the content of images for classification by event. In addition, the image content can be analyzed using computer vision and image understanding algorithms to detect a main subject of interest, or to classify it into different scenes, e.g., birthday party, graduation, wedding, picnic, beach activities, etc. This semantic information may be used to influence the overall theme, transitions, special effects, and music choices of the presentation. Past preferences of the user may also influence the first presentation. If, for example, the user had selected music type "Rock" (FIG. 3, 175) on the request bag 125 and the database of past preferences shows that, in the past, the user had ultimately preferred "Contemporary Rock" more often than "60's Rock" in the final presentation, then a "Contemporary Rock" soundtrack may be supplied with the initial presentation. With the user's images and multimedia materials, format selections and past preferences in hand, the service provider 40 assembles the first multimedia presentation by selecting from a set of pre-established and stored template files and adding the user's data files to the selected templates. The pre-established templates contain design features relating to the overall style, theme, type of transitions, etc., of the presentation which have been requested by the user. In addition, stored audio clips relating to the choices specified by the user and sized appropriately for length to provide a soundtrack to the presentation are added to the template at this point. The automated template feature will assemble and compose all the necessary materials into a multimedia composition. Then an appropriate encoding (such as MPEG) will be carried out to compress the multimedia composition into a multimedia bitstream for playback using for example a DVD player. Such a template-based method particularly useful for authoring a multimedia disk is disclosed in the commonly assigned, co-pending U.S. patent application Ser. No. 09/885,577 herein incorporated by reference. Finally, the service provider 40 writes the multimedia bit stream to a computer storage disk and sends the disk to the user. The service provider 40 may choose to write the multimedia image data to the disk in a resolution lower than that of the image data available in stored form, in order to better fit the data density requirements of the particular storage medium employed. The disk may be sent by mail or package delivery service to the user, or the user may pick up the first disk at a service pick-up location. In step 180, the user views the first presentation disk using a DVD or VCD player, or a personal computer. In decision step 185, if the user is satisfied with the first presentation, then the process ends with step 190. If, on the other hand, in step 185 the user is not satisfied with the first presentation, she then accesses a selection of new presentation formats in step 195 by downloading them from the service provider 40 to his/her personal computer using the Internet. The user then makes new format choices in step 200. Alternatively, the new presentation choices may be supplied on the original first presentation disk along with appropriate software to enable their viewing and selection. The choice of new presentation formats provided to the user may be made in an adaptive manner since, for example in step 205, the service provider 40 is continuously monitoring a user's choices in real time and modifying the selection of new formats offered, based upon these past choices. Also in step 200, using software tools well-known in the art, the user has the opportunity to further edit the presentation through the addition or deletion of images, or by cropping, rotating or adding captions to images. Next, in step 210, the user previews the revised presentation and decides in step 215 if she is satisfied with it. If the new presentation meets expectations, the user places an order for the new presentation in step 220. If the new presentation does not meet expectations in decision step 215, then the user is returned to the previous step 200 to make new selections and the cycle of selecting and previewing continues until the user is satisfied with the presentation. Once the order for a new presentation has been placed in step 220, the provider stores the user's final selections in a database in step 225 for use in aiding with future presentations which may be requested (see step 165). Finally, in step 230, the new presentation disk is produced and sent to the user by mail or delivery service. Alternatively, the user may be notified that the new presentation disk is available for at a service pick-up location. In yet another alternative, where the user possesses a compact disk writer, the user may elect to download the final presentation to her personal computer and write the presentation disk locally. Payment for the presentation may be by credit card over a network, or tendered at the service pick-up location by any of the usual means.

Figure 4:
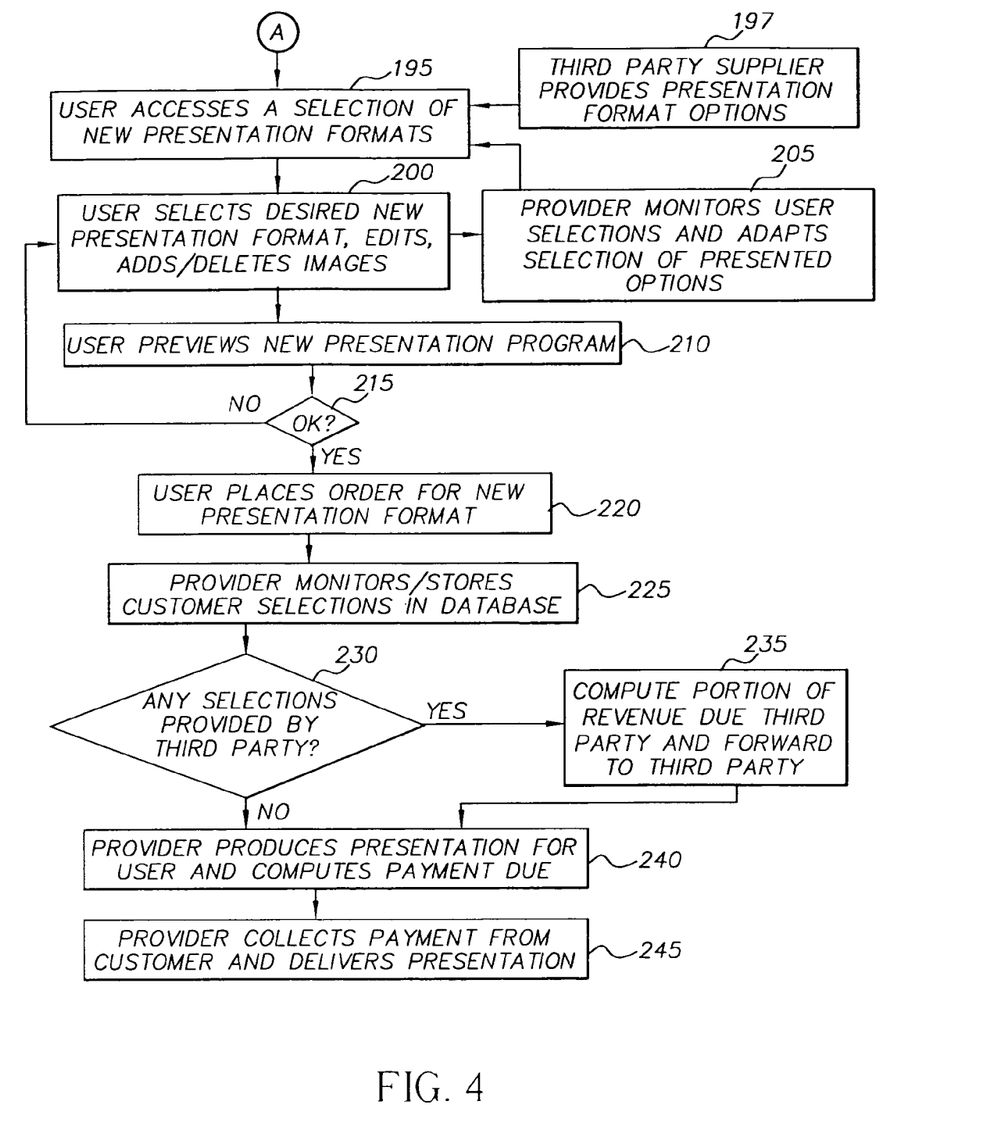
FIG. 4 depicts a flow chart illustrating the steps required in the practice of an alternative embodiment of the present invention.

A third party supplier can be an alternative source of presentation format options for a user to select from in revising the first presentation, and in FIG. 4 is shown the operation of such an embodiment of the invention. The embodiment of FIG. 4 operates exactly as the embodiment of FIG. 1 until the completion of step 185 (point A in FIG. 2) at which point the description continues in FIG. 4 at point A with like numbers indicating like steps in both FIGS. 2 and 4. In step 195 when a user accesses new presentation formats by downloading them from the service provider's website, some of these formats may be supplied by a third party supplier in step 197. Examples of third party-supplied presentation formats include, but are not limited to, sound clips for inclusion in the soundtrack of the presentation, stock images including still images or video clips which have subject matter related to the subject of the presentation and which add interest and variety to the presentation. As an example, if a user has supplied images from a family trip to the Winter 2002 Olympics, a third party site may offer a video clip of the opening ceremonies of the Olympics for inclusion in the presentation, or a sound clip of the "Olympic Fanfare" for use on a portion of the soundtrack. Copyrights needed for any of the third party supplied material are handled by the third party and means for sharing revenue between the service provider 40 and the third party are arranged automatically and in a way transparent to the user (see later steps in FIG. 4). Selections supplied by a third party may be indicated as such on the service provider's website, or not, depending upon the arrangement between the service provider 40 and third party. Advertising messages relating to a third party may also be displayed on the service provider's website, again depending upon the contractual arrangement between service provider 40 and the third party.

Continuing with FIG. 4, steps 200 through 225 are identical to the corresponding steps of the embodiment of FIG. 2. A determination is made in step 230 if any format selections had been provided by a third party and, if this was the case, then the portion of revenue due the third party is computed and forwarded to the third party by the service provider 40 in step 235. In step 240 the new presentation disk is produced and the final payment due is computed taking into account any third party charges. Finally, in step 245, the provider collects payment from the user as described previously for other embodiments, and the presentation is delivered to the user.

Figure 5:
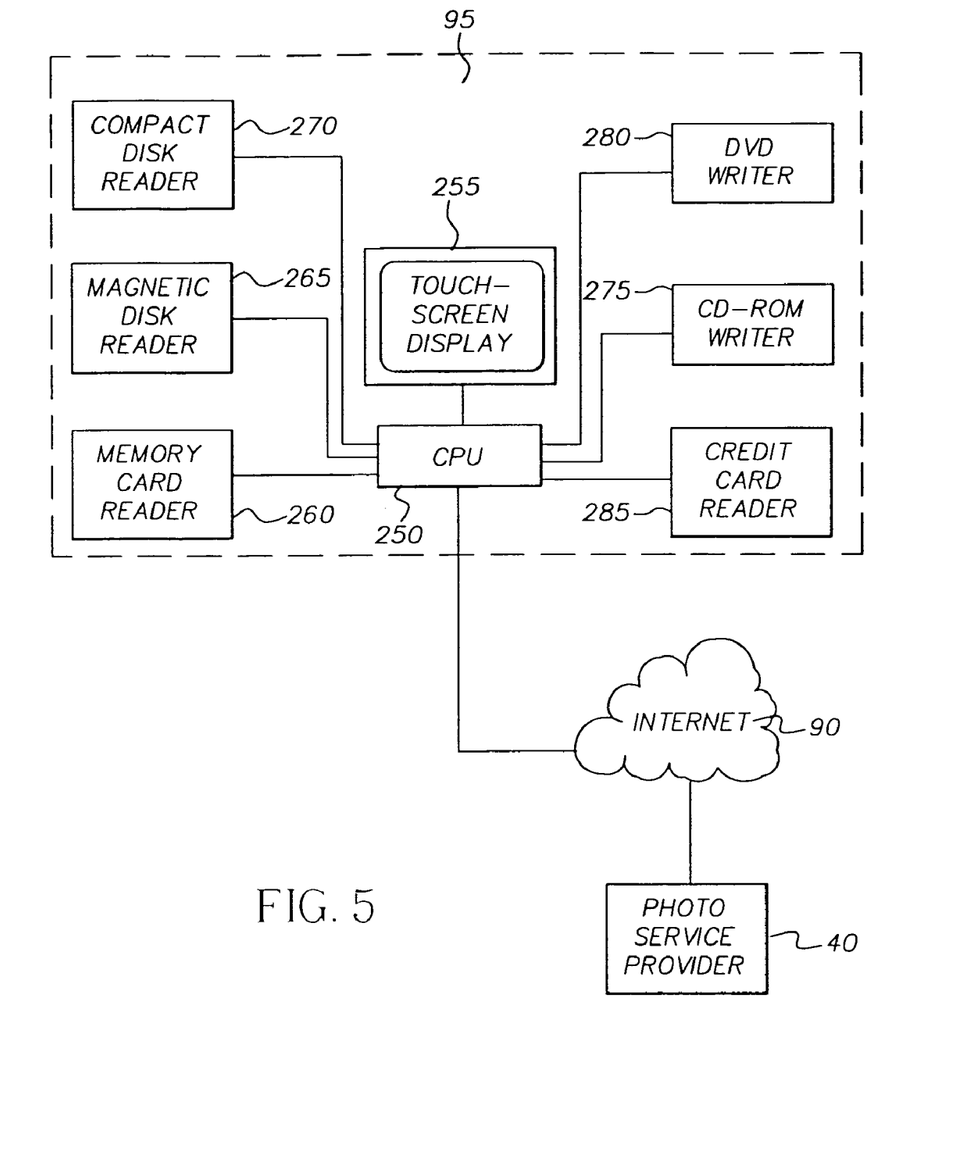
FIG. 5 depicts a system block diagram for a service kiosk useful in the practice of the present invention.

In yet another embodiment of the invention, the delivery of the first presentation format to a user and the user's subsequent modification to the presentation is carried out in a real-time interactive mode. The invention may be practiced in such an interactive mode using, for example, a service kiosk having image display capability where the user first specifies images and selects initial presentation criteria, and then views the first presentation format directly without the need to provide a first presentation on a disk to the user. After an initial review of the first presentation, the user is able to access a selection of new formats directly at the kiosk and preview the new presentation and approve it before a final disk containing the user's final choice of presentation format is produced. A block diagram of the components of such a service kiosk is shown in FIG. 5. Referring to FIG. 5, kiosk 95 comprises essentially a CPU 250 connected to touch-screen display 255 for displaying a multimedia presentation to a user and enabling the user to make selections of presentation formats. Connected to the computer 250 are inputs 260 for accepting flash memory cards, 265 for accepting magnetic computer storage disks, and 270 for accepting CD-ROM storage disks. The computer 250 in kiosk 95 is connected to photo service provider 40 via a communications network 90, such as the Internet, and is loaded with software and a user interface appropriate to the interactive creation of a multimedia presentation disk as described in detail below. Also connected to computer 250 are compact disk writer 275 and DVD writer 280 for writing the final disk selection for the user. Credit card reader 285 for accepting payment is also connected to CPU 250.

Figure 6:
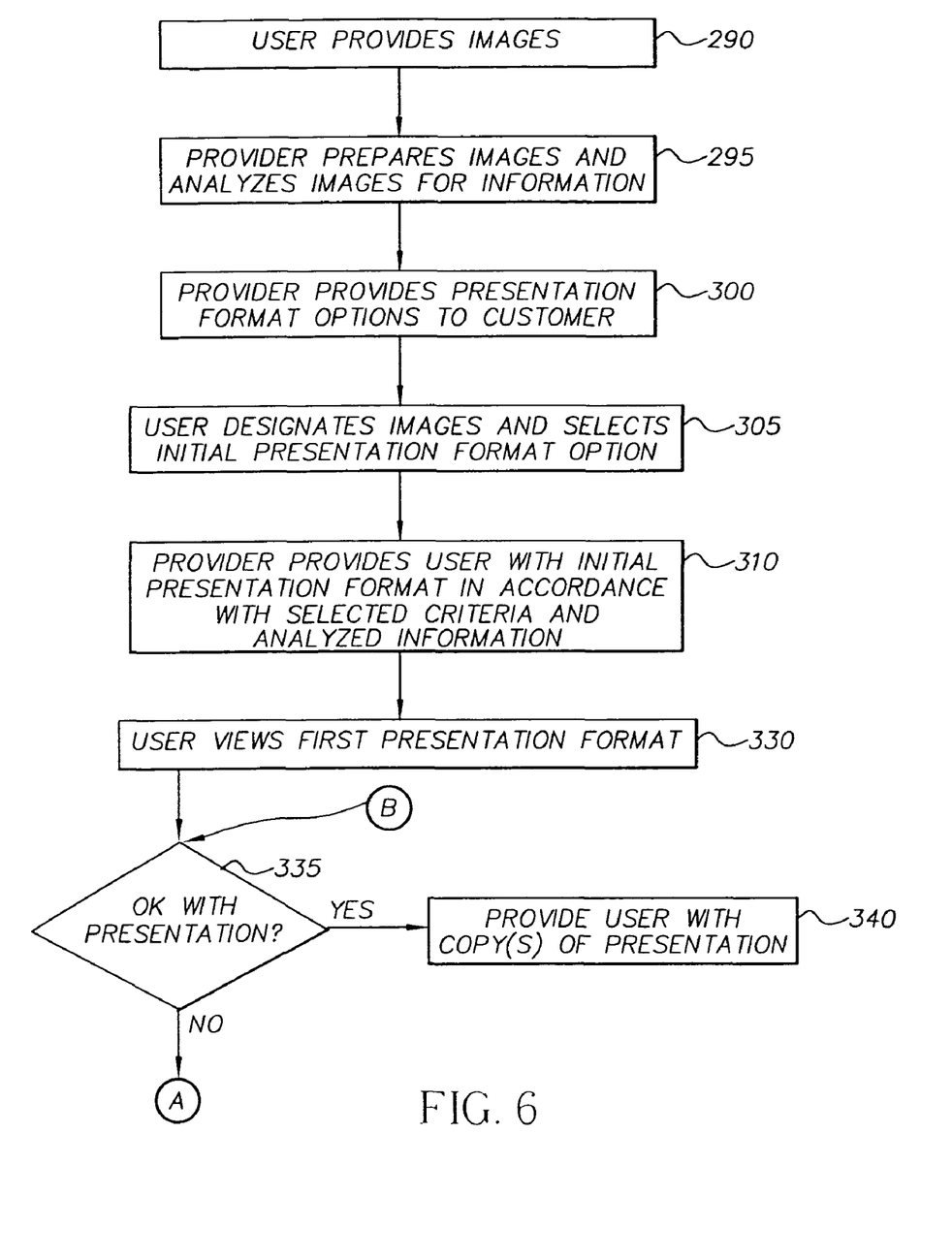
FIG. 6 depicts a flow chart illustrating the steps required in the practice of an alternative embodiment of the present invention.
Figure 7:
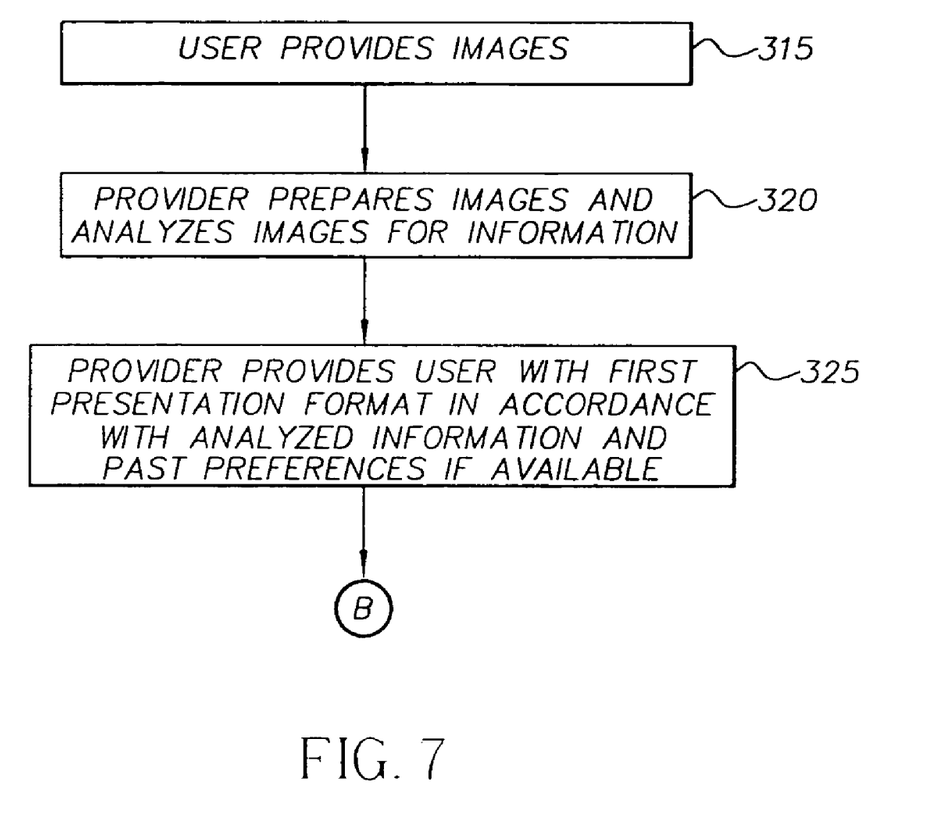
FIG. 7 depicts a flow chart illustrating the steps required in the practice of an alternative embodiment of the present invention.

Referring now to FIG. 6, the steps in detail to be carried out in the operation of this interactive embodiment of the invention are shown. As in previously described embodiments, the user first provides hard copy or digital images and multimedia material to be included in the presentation to a service provider 40 (step 290) and the service provider 40 prepares the images and analyzes them for information (step 295) as in the embodiments already described. Once the images have been prepared and posted to the user's account, the user may access at any time his account at a service kiosk location where, in step 300, the service provider 40 provides an initial set of presentation format options. The options offered initially can be, for example, identical to the options offered on the photo service request bag shown in FIG. 3, except that in this interactive embodiment of the invention, examples of the actual appearance of the options are shown to the user using the image display capability of the service kiosk to aid in the selection process. As an example, if the "Halloween" theme is selected, a portion of a sample presentation in which the "Halloween" theme is used is shown to the user. After he is satisfied with previewing the various presentation options, the user designates the particular presentation format options he wishes to have using, for example, a touch screen user interface in step 305. The provider then prepares the initial presentation format in accordance with the user's selected criteria and any analyzed information available and plays the initial presentation for the user by means of the kiosk's image display capability (step 310). The service provider 40 may choose to provide the multimedia image data to the kiosk in a resolution lower than that of the image data available in stored form, in order to better fit the data transmission requirements of the particular communications network 90 employed. Turning for a moment to FIG. 7, there is shown a further variation in the initial steps of this interactive embodiment of the invention where the user provides only images and does not need to make any selection of presentation criteria for the first presentation. In this variation, the user first provides images to the service provider 40 in step 315 as previously described. In step 320, the service provider 40 prepares the images and analyzes them for information regarding, for example, the date, time or location of image capture which may be present in the metadata for the image. In addition to the information in the image metadata available for the images provided, the service provider 40 also may use various image understanding algorithms to automatically determine the subject matter of at least some of the images. For example, object recognition algorithms may be applied to the digital images to determine if well-known cultural icons are present such as, for example, Christmas trees, birthday parties or graduation robes. The presence of such icons in the images allows a reasonable inference regarding the type of event which may have been the occasion for the images to be captured. Such information will provide user specific information for selecting overall theme, mood, and music. For example, if the images are analyzed to be of a particular season likes winter, the authoring system can selectively offer music suitable for winter season. The choices can be further refined with the knowledge of the type of event such as Christmas celebration. In addition, the service provider 40 also examines the database of past preferences of the particular customer in presentation formats, including types of transitions, choices of music for the sound track, etc. Based on all this information, the service provider 40 then creates and displays an initial presentation format to the user in step 325.

Returning now to FIG. 6, the sequence of steps for both the interactive embodiments of FIG. 6 and FIG. 7 begin again at point B in FIG. 6. In step 330, the user views the trial presentation format on the kiosk's display and if he is satisfied with it (step 335), then a disk is written locally at the service kiosk and provided to the customer in step 340 and payment is also collected.

The remaining steps in both interactive embodiments are now identical to the embodiment of FIG. 1, beginning at point A in FIG. 2. Still working at the kiosk, if the user was not satisfied with the first presentation in step 335, he is able to access a selection of new presentation formats, select new criteria, add/delete or edit images, etc, and repeat these steps just as previously described for the embodiment of FIG. 2 until he is satisfied with the presentation. As before, once satisfied, the user places an order and receives and pays for a copy of his presentation written on a media disk at the kiosk. It should be appreciated that while lower resolution data may have been employed in order to supply trial presentations for display at the kiosk 95, the data written to the media disk may utilize the full image resolution available in the stored image data files.

It will also be understood that such an interactive embodiment, essentially like that just described, may also be practiced by a user from a personal computer where initial format selections are made and an initial presentation is viewed and modified without creating a first presentation disk. In this variation, the final presentation would be downloaded and written to a disk locally at the user's personal computer.

The invention has been described in detail with particular reference to certain preferred embodiments thereof, but it will be understood that variations and modifications can be effected within the scope of the invention.

PARTS LIST 10 system
15 playback media disk
20 computer
25 video CD player
30 DVD player
35 television set
40 photo service provider
45 exposed film
50 photo negatives
55 photo prints
60 service drop off location
65 video tape
70 audio cassette
75 flash memory card
80 computer disk
85 transportation means
90 Internet
95 service kiosk
100 computer disk
105 third party content provider
110 conventional delivery means
120 step
125 photo service request bag
130 address/ID entry space
135 service option selection box
140 processing options selection boxes
145 presentation format options
150 presentation format options
155 presentation format options
160 step
165 step
170 step
175 presentation format option
180 step
185 step
190 step
195 step
197 step
200 step
205 step
210 step
215 step
220 step
225 step
230 step
235 step
240 step
245 step
250 CPU
255 touch-screen display
260 memory card reader
265 magnetic disk reader
270 compact disk reader
275 compact disk writer
280 DVD writer
285 credit card reader
290 step
295 step
300 step
305 step
310 step
315 step
320 step
325 step
330 step
335 step
340 step

What is claimed is:

1. A method for customizing a multimedia presentation of a set of digital still images provided by a user to a service provider, over a communication network comprising the steps of:
   the user providing a set of digital still images to the service provider;
   selecting by the user an initial presentation criteria including theme related audio and transitions for the set of digital images by the user to the service provider;
   using a computer to analyze the digital still images for additional information including event type semantic information by the service provider to produce a first customized digital multimedia presentation based upon the initial selected presentation criteria;
   the user receiving from the service provider the first customized digital multimedia presentation containing images from the set of digital still images, theme related audio, and transitions over the communication network;
   the user receiving over the communication network additional presentation criteria in an adaptive manner from the service provider enabling the user to select additional presentation criteria, which is sent to the service provider; and
   the user receiving in response to selected additional presentation criteria a second digital multimedia presentation from the service provider.

2. The method according to claim 1 further comprising the steps of including a selection menu for providing instructions for modifying or changing the first digital multimedia presentation to the second digital multimedia presentation.

3. The method according to claim 2 further comprising the step of maintaining a record of the selection of the instructions of user for future use in associating other collections of digital images.

4. The method according to claim 1 wherein the analyzing step further comprises automatically grouping said images by subject or event type.

5. A method according to claim 1 wherein the analyzing step further comprises automatic selection of visual image presentation type and audio type.

6. A method according to claim 1 wherein the analyzing step further comprises automatically identifying a theme for said presentation.

* * * * *